United States Patent [19]

Carr et al.

[11] Patent Number: 5,008,748
[45] Date of Patent: Apr. 16, 1991

[54] SIGNAL CODING

[75] Inventors: Michael D. Carr; Maurice G. Perini; John O'Donnell; Anthony B. Leaning; Anthony R. Leaning, all of Ipswich, England

[73] Assignee: British Telecommunications public limited company, United Kingdom

[21] Appl. No.: 364,441
[22] PCT Filed: Aug. 26, 1988
[86] PCT No.: PCT/GB88/00709
§ 371 Date: Jun. 2, 1989
§ 102(e) Date: Jun. 2, 1989
[87] PCT Pub. No.: WO89/02206
PCT Pub. Date: Mar. 9, 1989

[30] Foreign Application Priority Data
Aug. 28, 1987 [GB] United Kingdom ............... 8720390
Oct. 19, 1987 [GB] United Kingdom ............... 8724790

[51] Int. Cl.$^5$ ............................................. H04N 7/13
[52] U.S. Cl. ................................... 358/136; 358/105; 358/135
[58] Field of Search ................ 358/133, 135, 136, 105

[56] References Cited
U.S. PATENT DOCUMENTS

| | | | |
|---|---|---|---|
| 4,369,464 | 1/1983 | Temime | 358/136 |
| 4,542,411 | 9/1985 | Imanaka | 358/133 |
| 4,591,909 | 5/1986 | Kuroda et al. | 358/136 |
| 4,667,233 | 5/1987 | Furukawa | 358/136 |
| 4,717,957 | 1/1988 | Santamaki et al. | 358/136 |
| 4,734,767 | 3/1988 | Kaneko | 358/133 |
| 4,827,338 | 5/1989 | Gerard | 358/136 |

FOREIGN PATENT DOCUMENTS 87-02854 5/1987 World Int. Prop. O. .

Primary Examiner—Howard W. Britton
Attorney, Agent, or Firm—Nixon & Vanderhye

[57] ABSTRACT

The present invention relates to signal coding, and particularly, though not exclusively, to coding of video signals, especially using conditional replenishment coding, where information is transmitted only in respect of elements of a frame of the picture which have changed relative to the previous frame; the transmitted data being used at a receiver to update a stored version of the picture. According to one aspect of the present invention there is provided a method of coding a set of values comprising selecting that one of a plurality of possible sequences of the values which has the highest correlation between successive values in the sequence, and supplying representations of those values to an output; wherein some of the representations are the differences between the relevant value and a prediction based on at least the immediately preceding value in the selected sequence. Although the method is applicable to other forms of signal, it finds particular application in video coding. Thus in another aspect we provide a method of coding an image comprising, for the image area or for each of a plurality of individual areas thereof, selecting that one of a plurality of possible sequences of the picture elements within the area which has the highest correlation between successive elements in the sequence, and supplying representations of those elements to an output; wherein some of the represents are the differences between values of the relevant element and a prediction based on the value of at least the immedicately preceding element in the selected sequence. Normally the representations will be transmitted in an order which corresponds to the selected sequence, though this is not in principle essential.

12 Claims, 3 Drawing Sheets

Fig. 1.
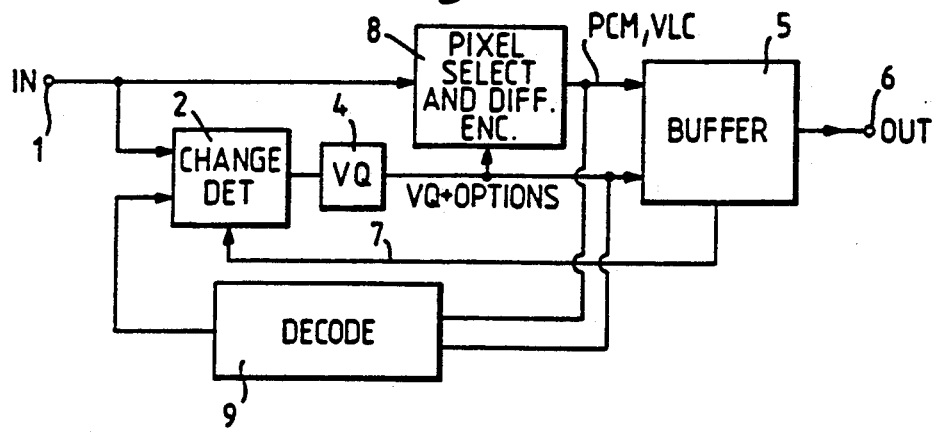
Fig. 2.
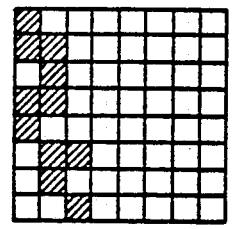
Fig. 3(a)    Fig. 3(b)    Fig. 3(c)    Fig. 3(d)
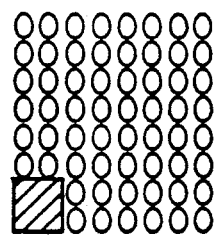 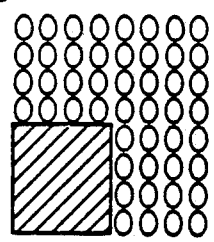 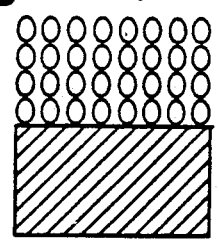 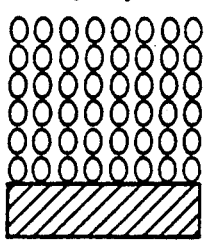
Fig. 3(e)    Fig. 3(f)    Fig. 3(g)    Fig. 3(h)
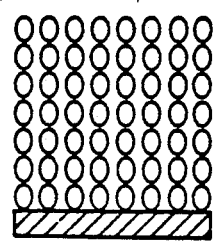 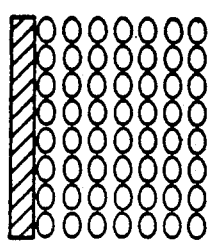 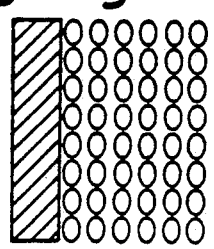 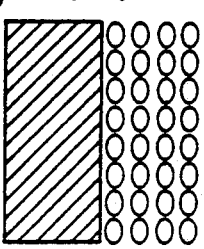

⊘ SUBSAMPLED ELEMENTS

SIGNAL CODING

This application is related to copending commonly assigned application Ser. No. 07/364,442 filed June 2, 1989 to Messrs. Carr and Leaning and claiming priority of Oct. 10, 1987 via PCT/GB No. 88/00871 filed Oct. 10, 1988.

The present invention relates to signal coding, and particularly, though not exclusively, to coding of video signals, especially using conditional replenishment coding, where information is transmitted only in respect of elements of a frame of the picture which have changed relative to the previous frame; the transmitted data being used at a receiver to update a stored version of the picture.

According to one aspect of the present invention there is provided a method of coding a set of values comprising selecting that one of a plurality of possible sequences of the values which has the highest correlation between successive values in the sequence, and supplying representations of those values to an output; wherein some of the representations are the differences between the relevant value and a prediction based on at least the immediately preceding value in the selected sequence.

Although the method is applicable to other forms of signal, it finds particular application in video coding. Thus in another aspect we provide a method of coding an image comprising, for the image area or for each of a plurality of individual areas thereof, selecting that one of a plurality of possible sequences of the picture elements within the area which has the highest correlation between successive elements in the sequence, and supplying representations of those elements to an output; wherein some of the representations are the differences between values of the relevant element and a prediction based on the value of at least the immediately preceding element in the selected sequence.

Normally the representations will be transmitted in an order which corresponds to the selected sequence, though this is not in principle essential.

The choice of squence may be made by evaluating different sequences, but in some circumstances it may be possible to infer an appropriate choice from earlier coding steps. Thus in a further aspect of the invention there is provided a method of coding an image comprising, for each of a plurality of blocks of an image:

(i) comparing picture elements of the block with those of the corresponding block of a previously coded image to produce a matrix of values each indicating whether the corresponding element is, in accordance with a predetermined criterion, deemed to have changed between the two images;

(ii) matching the matrix to one of a predetermined set of such matrices each of which identifies a region of the block as being deemed to have changed;

(iii) coding for output those elements within the identified region, at least some of the elements being coded as the difference between that element and a predicted value for that element derived from one or more previously coded elements of the block, the sequence of coding of the elements being dependent on the orientation of the identified region.

The invention also extends to coding apparatus for performing the method.

Some embodiments of the invention will now be described, by way of example, with reference to the accompanying drawings, in which:

FIG. 1 is a block diagram of one possible form of coder according to the invention;

FIG. 2 illustrates a movement matrix;

FIGS. 3a-3h illustrate some vector quantisation (VQ) shapes;

Figure 4:
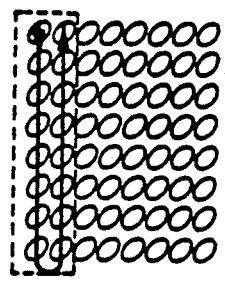
FIG. 4, 5 and 6 illustrate possible scan paths.

FIG. 1 shows a conditional replenishment video coder, where video signals (assumed to be in digital form) are supplied to an input 1. The current frame of a picture is compared in a change or movement detector 2 with the output of a local decoder 3. The local decoder produces a "previous frame" output which is the same as that produced by a remote decoder; the object of the comparison is to identify those parts of the picture which have changed so that only information concerning those parts needs to be sent to the decoders, to update a stored representation of the frame.

The signals are processed on a block-by-block basis—an $8 \times 8$ block is assumed—and the change detector 2 therefore produces an $8 \times 8$ bit map. A typical map is shown in FIG. 2, where the elements of the block corresponding to picture elements, (pixels) which have changed are shown shaded.

In practice, transmission of information concerning only the changed elements involves a significant addressing overhead and therefore it is preferred to match the bit map to one of a limited number—typically 128—of standard shapes (a few are illustrated in FIGS. 3a-3h). Since it is preferable to transmit information for an unchanged pixel than to fail to transmit information for a changed pixel, the shape chosen is the smallest (i.e. with the least number of shaded elements) which has a shaded area covering the shaded elements of the bit map. This process is termed vector quantisation (VO) and is indicated as vector quantiser 4 in FIG. 1. One transmits, for the block, a VQ number identifying the chosen shape, along with information concerning pixels deemed—in accordance with the chosen shape—to have changed. The output data are combined and buffered in a buffer 5 prior to passage to an output 6. As is conventional in such systems, the buffer is used to smooth variations in the rate at which data are generated (due to the picture content dependent coding) and interface to a regular transmitted rate) and the buffer fullness state used to control the rate of generation (eg. by varying the change detector thresholds (control line 7).

Inter-element differential coding is used for coding the pixels. The object of differential coding is to take advantage of the correlation between successive elements to reduce the amount of data which need to be transmitted. In this coder, variation of the sequence of transmission of the pixels is permitted, the object being to choose that one of a plurality of allowed sequences which miximizes the inter element correlation—it being understood that the differential coding uses the immediately preceding element in the sequence as predictor (though the use of other elements as well is not ruled out). The decoder must of course be informed, by some means, which sequence has been chosen.

It should be noted that it is not actually necessary (although it is certainly convenient) that the order in which the data are transmitted corresponds to the chosen sequence. What is important is that the prediction used for the differential coding is, or at least involves, the preceding element in the chosen sequence.

In principle one could examine different possible sequences and asses which has the highest correlation (e.g. by computing the sum of the squares of the differential values). However where, as in this example, vector quantisation is employed, it possible to infer the sequence from the VQ shape—this reduces computation and the VQ number can indicate the sequence to the decoder.

For example, consider the shape shown in FIG. 3(g). All the "changed" pixels are at the left-hand edge of the block, and therefore there is a high probability that these correspond to a vertical edge moving horizontally in the image. We deduce that taking the pixels in vertical sweeps, for example as illustrated in FIG. 4, will give a better inter-pixel correlation than a horizontal scan, and therefore this sequence is chosen for the differential coding.

For blocks (eg. FIG. 3b) having no particular orientation, or blocks having large numbers of changed pixels it may be preferable to adopt a different coding strategy. An example of a coding scheme (carried out by unit 8 of FIG. 1) will now be described in more detail.

Figure 5:
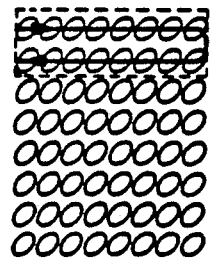
Figure 6:
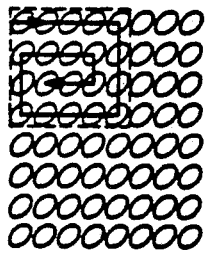

1. For small VQ shapes, typically those containing less than 24 pixels (the maximum for an 8×8 block is of course 64): The actual value of the first pixel in the VQ shape is first transmitted. The values of the subsequent pixels in the VQ shape are transmitted in the form of an error signal using the quantised prediction error between the previous transmitted element in the VQ shape and the current element. These quantised values are coded and transmitted. The number of values transmitted for small VQ shapes is implicit in the VQ number since all pixels in the VQ shape are transmitted. The order in which the pixels are transmitted is also implied by the VQ number. Shapes with vertical orientation are transmitted in the order shown in FIG. 4. VQ shapes with horizontal orientation are transmitted in the order shown in FIG. 5, whilst a VQ shape with no particular orientation is transmitted in spiral format as shown in FIG. 6. Variable length coding may be used in known manner for the transmitted values.

2. For larger VQ shapes, typically those containing more than 24 "changed" pixels, a sequence selection is made (through for a different reason from that outlined above). That scanning order (of a limited number of permitted sequences) is chosen which has the least number of non-"changed" pixels between the first and last "changed" pixels, and leading and trailing unchanged pixels are not transmitted. The transmitted information in this case is the VQ code, a Scan Class code identifying the sequence, the address of the first pixel to be transmitted, the number of pixels to be transmitted, and the actual pixel data (transmitted, as before, as one absolute value followed by differential values).

Figure 7:
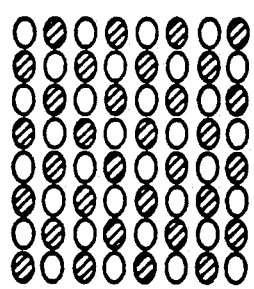
FIG. 7 is a block diagram of a change of movement detector which may be used in the apparatus of FIG. 1.
Figure 7:
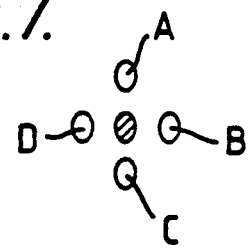

3. Optionally (through not illustrated in the Figures), certain large VQ shapes may be element subsampled to further reduce the data rate during large motion. Subsampling may be performed on a fixed quincunx format as illustrated in FIG. 7 and its use is implied to the decoder by the use of certain VQ numbers. The class code, the address of the first pixel to be transmitted and the number of pixels to be transmitted are sent, as before. Only the elements which are not on the quincunx grid and fall between the start of the scan (given by ABSXY) and the last element in the scan are subsampled. The decoder uses the surrounding transmitted elements to interpolate the values of the subsample pixels. The following rules are used: The maximum and minimum values of pixels A,B,C and D are found and discarded. The value inserted for the subsampled value is simply the average of the remaining two pixels.

A typical coding format is as follows:
PH Picture Data PH Picture Data PH etc. . .
 PH is the Picture Header which has the following structure:
 PSC BS TR
 PSC is the Picture Start Code which is a 21 bit unique word
  0000 0000 0000 0001 0000 0
 BS is the encoder buffer state sampled at the time of the top of the picture and represented with 6 bits, MSB first.
 TR is the picture's temporal reference; simply a 3 bit number (MSB first) representing the sequence of the PH in modulo-8 form.

The picture is considered to be divided into Groups of Blocks (GOB), each of which consists of 44 luminance blocks, one line of 22 chrominance (R-Y) blocks and one line of 22 chrominance (B-Y) blocks.
 Picture Data is structured in the following way
 GBSC, GN, GOB data
 GBSC is the Group of block Start Code which is a 16 bit word:
 0000 0000 0000 0001
 GN is the group number. This is a 5bit number signifying the vertical spatial position, in units of groups, of the current groups of blocks. GN is transmitted MSB first and has the range 1 at the top of the picture and 18 at the bottom. All 18 GBSC along with their corresponding GN will be transmitted.
 GOB data has the following structure:

BA PCM VQ Scan ABSXY TOTVLC VLC, VLC, VLC.etc BA PCM VQ Scan
Class                                     Class
                 Optional Fields
etc, etc . . .

BA—is the block address within a GOB. It is a variable length code word and gives the run length of the non-transmitted blocks between this block and the previous transmitted block. In the case of the first transmittedblock in a GOB, BA gives the absolute address.
PCM—this is the PCM value of the first pixel coded within the VQ shape. This serves to prevent error extension between blocks.
VQ—is a 6 bit word representing the VQ number for the moving area.
Scan Class—This is a 2 bit optional field which occurs for certain VQ numbers (i.e. certain VQ numbers imply its presence). Its purpose is to allow the pixel scan path to be indicated for larger VQ shapes.
ABSXY—is a 6 bit optional field giving the address of the first changed pixel within the VQ shape. This is only used on the larger VQ shapes and its existence is implied by the use of certain preceding VQ numbers.

TOTVLC—This is a 6 bit optional field which occurs for certain VQ numbers (ie certain VQ numbers imply its presence). It indicates the number of VLC codes present in the following VLC field.

VLC—is a variable length word giving the prediction error of the current element using the previous transmitted element as a predictor. The number of VLC values is determined by the number of pixels in the VQ shape or by the use of TOTVLC when present.

Note: The optional fields will either be all present or all absent dependent on the VQ number of a particular block.

Figure 8:
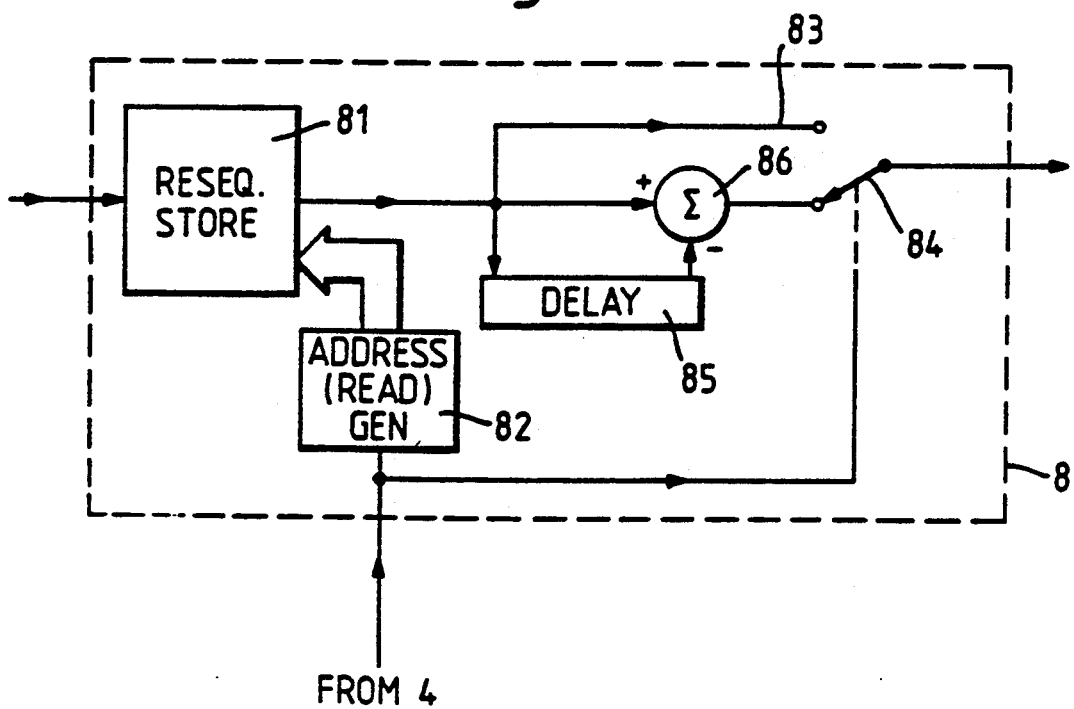

The structure of the coding unit 8 is illustrated in FIG. 8. The incoming pixel data are received by a resequencing store 81, where the data are stored in the order in which they arrive and the data determined by the VQ shape selected are read out under control of an address generator 82 in the order required for that shape. The data PCM for the first transmitted element pass directly via a line 83 directly to the output 83 of the unit; for subsequent elements the output is taken via a changeover switch 84 from a differential coder comprising a one-element delay 85 and subtractor 86.

For the larger VQ shapes-where, it will be recalled, the transmission sequence is still varied but differential coding not used—of course the switch 84 remains in its upper position bypassing the differential coder 85, 86.

Figure 9:
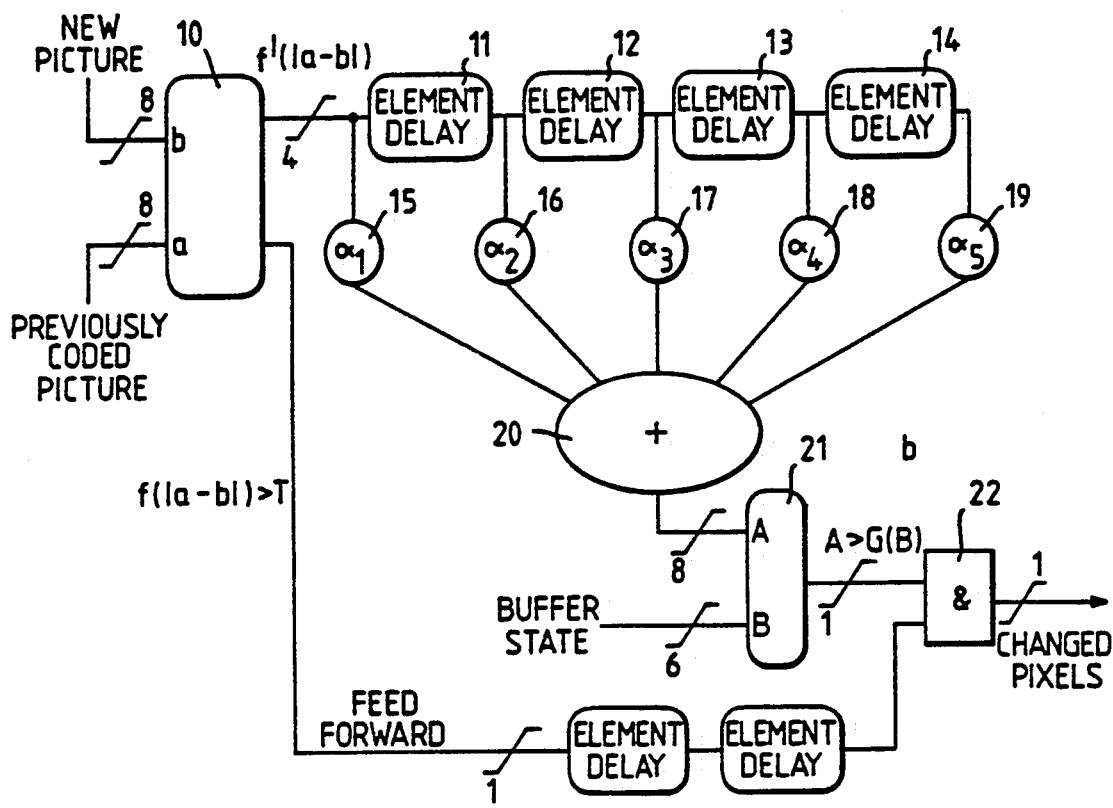

The change, or movement, detector 2 can in principle be any of those conventionally used. However, a preferred version is shown in FIG. 9.

Block 10 is a PROM containing look-up tables to compare the previously coded picture (decoded by a local decoder 9) with the new incoming picture. The modulo of the pixel-by-pixel frame-to-frame difference (d) is subjected to the non-linear expression:

$$f(|a-b|) = [1 - e^{-(d/k)^g}]$$

where k is a constant currently set to 10, and g is a constant currently set to 0.9

This has the effect of reducing the small pixel frame differences (noise) while leaving the large frame differences unchanged. These modified frame differences are then truncated to four bits by forcing all values greater than 15 to the value 15 and leaving values less than 15 unchanged (indicated as f'(|a−b|) in FIG. 9). The look-up table in block 10 also generates a signal which indicates if the magnitude of the modified frame difference is greater than some threshold T (T is typically set to 5). This signal is fed forward to an AND gate 22.

The four bit modified frame difference is then passed through the transversal filter containing element delays 11, 12, 13 and 14, multipliers (PROM look-ups) 15, 16, 17, 18 and 19 and an adder at block 20. The multiplier values alpha 1, 2, 3, 4 and 5 have typical values x4, x8, x12, x8, x4. The sum of the weighted modified frame differences is then compared with a threshold in a comparator 21. This threshold is varied according to the fullness of the coders channel buffer in a way which reduces the number of moving pixels as the coders channel buffer becomes full. we currently use the following formula:

Treshold $G(B) = 8 [10 + (B)/3]$ where the buffer state B is a number between 0 and 63 indicating the number of Kbits of data contained in the buffer.

Changed pixels are signalled on a pixel-by-pixel basis by the AND gate 22 if the sum of the weighted modified frame differences is greater than G(B) AND the feed forward path threshold condition is met. The reason for including the feed forward path is because the transversal filter mechanism tends to spread the frame differences which has the effect of causing pixels adjacent to a large frame difference to exceed the threshold G(B). A simple check to establish if the pixel had a significant frame difference before transversal filtering limits changed pixel generation to only those points which have truly changed.

The vector quantiser 4 can again be a known device. One possibility is that described in our UK patent application no. 8627787.

Simpler but cruder, another option is to convert the 8×8 matrix to a 4×4 matrix br creating each 'new' element as an OR function of four 'old' elements; this reduces the number of elements in the matrix to a size (16) which can be used to address a look-up table—in the form of a 64 Kbyte read only memory in which the appropriate VQ numbers are stored.

Figure 10:
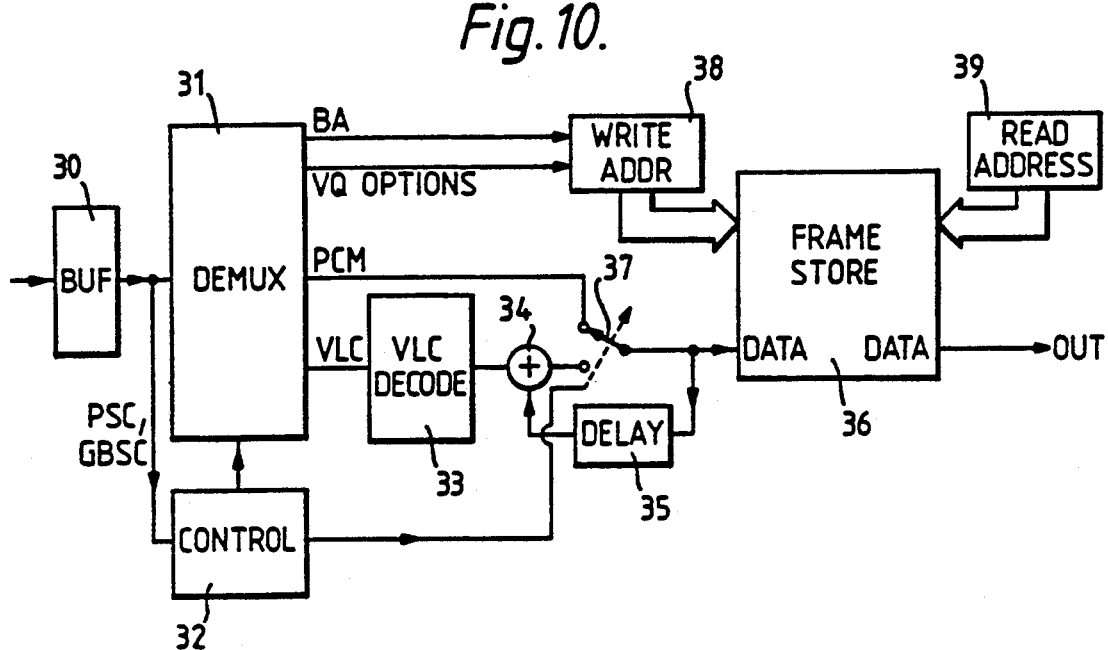

FIG. 10 is a block diagram of a decoder for use with the coder described above. The incoming data is first supplied to a buffer 30 which serves to buffer the rate at which data are received to the irregular rate at which they are processed. The data are demultiplexed by a demultiplexer 31 under control of a control unit 32 which recognizes the start codes (PSC, GBSC). The variable length codes are decoded in a VLC decoder 33 and then pass via a differential decoder comprising an adder 34 and delay 35 to the data input of a video frame store 36. The first absolute pixel value PCM is switched in to reset the delay line via a switch 37.

The block address BA and the code VQ and the VQ options if present are used by a write address generator 38 to compute, in accordance with the transmission sequence indicated by these variables, the pixel coordinate (and hence address in the store 36) of each element value supplied to the data input of the store 36, so that these values are entered into the appropriate locations in the store 36 to updata the 'received' picture. The picture element data are read out sequentially under control of a read address generator 39 to produce and output video signal.

This arrangement assumes a store 36 capable of random addressing for write purposes, so that effectively the original sequence of the data is restored by controlling the sequence of addresses from the generator 38. Alternatively, of course, the data could be 'shuffled' using a resequencing store such as the store 81 (FIG. 8) used in the coder.

The local decoder 9 shown in FIG. 1 may have the same structure as that shown in FIG. 10—except that the buffer 30 and demultiplexing arrangements 31, 32 would not be required.

We claim:

1. A method of coding an image comprising, for the image area or for each of a plurality of individual areas thereof, selecting that one of a plurality of possible sequences of the picture elements within the area which has the highest correlation between successive elements in the sequence, and supplying representations of those elements to an output; wherein some of the representations are the differences between values of the relevant element and a prediction based on the value of at least the immediately preceding element in the selected sequence.

2. A method of coding an image comprising, for each of a plurality of blocks of an image:
   (i) comparing picture elements of the block with those of the corresponding block of a previously coded image to produce a matrix of values each indicating whether the corresponding element is, in accordance with a predetermined criterion, deemed to have changed between the two images;
   (ii) matching the matrix to one of a predetermined set of such matrices each of which identifies a region of the block as being deemed to have changed;
   (iii) coding for output those elements within the identified region, at least some of the elements being coded as the difference between that element and a predicted value for that element derived from one or more previously coded elements of the block, the sequence of coding of the elements being dependent on the orientation of the identified region.

3. A method of coding an image comprising, for each of a plurality of blocks of an image:
   (i) comparing picture elements of the block with those of the corresponding block of a previously coded image to produce a matrix of values each indicating whether the corresponding element is, in accordance with a predetermined criterion, deemed to have changed between the two images;
   (ii) matching the matrix to one of a predetermined set of such matrices each of which identifies a region of the block as being deemed to have changed;
   (iii) coding for output those elements within the identified region, at least some of the elements being coded as the difference between that element and a predicted value for that element derived from one or more previously coded elements of the block, the sequence of coding of the elements being dependent on the orientation of the identified region; and
   (v) when the region is of a generally vertically extending elongate shape the coding sequence is defined by a scan of the region in vertical sweeps and when the region is of a generally horizontally extending elongate shape the coding sequence is defined by a scan of the region in horizontal sweeps.

4. A method of coding an image comprising, for the image area or for each of a plurality of individual areas thereof, selecting that one of a plurality of possible sequences of the picture elements within the area which has the highest correlation between successive elements in the sequence, and supplying representations of those elements to an output; wherein some of the representation are the differences between values of the relevant elements and a prediction based on the value of at least the immediately preceding element in the selected sequence; and
   wherein the representation are output in the selected sequence.

5. An apparatus for coding an image comprising means operable for the image area or for each of a plurality of individual areas thereof, to select that one of a plurality of possible sequences of the picture elements within the area which has the highest correlation between successive elements in the sequence, and means for coding representation of those elements; wherein some of the representations are the differences between values of the relevant element and a prediction based on the value of at least the immediately preceding element in the selected sequence.

6. An apparatus for coding an image comprising,
   (i) means for comparing, for each of a plurality of blocks of an image, picture elements of the block with those of the corresponding block of a previously coded image to produce a matrix of values indicating whether the corresponding element is, in accordance with a predetermined criterion, deemed to have changed between the two images;
   (ii) means for matching the matrix to one of a predetermined set of such matrices each of which identifies a region of the block as being deemed to have changed;
   (iii) means for coding for output those elements within the identified region, at least some of the elements being coded as the difference between that element and a predicted value for that element derived from one or more previously coded elements of the block, the sequence of coding of the elements being dependent on the orientatio of the identified region.

7. An apparatus for coding an image comprising:
   (i) means for comparing, for each of a plurality of blocks of an image, picture elements of the block with those of the corresponding block of a previously coded image to produce a matrix of values indicating whether the corresponding element is, in accordance with a predetermined criterion, deemed to have changed between the two images;
   (ii) means for matching the matrix to one of a predetermined set of such matrices each of which identifies a region of the block as being deemed to have changed:
   (iii) means for coding for output those elements within the identified region, at least some of the elements being coded as the difference between that element and a predicted value for that element derived form one or more previously coded elements of the block, the sequence of coding of the elements being dependent on the orientation of the identified region;
   said meas for coding operating, when the region is of a generally vertically extending elongate shape to effect the coding sequence by a scan of the region in vertical sweeps and when the region is of a generally horizontally extending to effect the coding sequence by a scan of the region in horizontal sweeps.

8. An apparatus for coding an image comprising means operable for the image area or for each of a plurality of individual areas thereof, to select that one of a plurality of possible sequences of the picture elements within the area which has the highest correlation between successive elements in the sequence, and means for coding representations of those elements; wherein some of the representations are the differences between values of the relevant element and a prediction based on the value of at least the immediately preceding element in the selected sequence, and wherein the coding means is arranged to output the differences in the selected sequence.

9. An apparatus for coding an image comprising:
   (i) means for comparing, for each of a plurality of blocks of an image, picture elements of the block with those of the corresponding block of a previously coded image to produce a matrix of values indicating whether the corresponding element is, in accordance with a predetermined criterion, deemed to have changed between the two images;

(ii) means for matching the matrix to one of a predetermined set of such matrices each of which identifies a region of the block as being deeemed to have changed:

(iii) means for coding for output those elements within the identified region, at least some of the elements being coded as the difference between the element and a predicted value for that element derived from one or more previously coded elements of the block, the sequence of coding of the elements being dependent on the orientation of the identified region;

the comparing means including means for forming a first change signal representative of the difference between each picture element of a current frame of the video signal and a previous frame of the signal;

filter means for forming a weighted sum of the first change signals formed in respect of a picture element under consideration and picture elements spatially adjacent thereto and comparing the sum with a threshold;

means for forming a second change signal representative of the difference between each picture element of a current frame of the video signal and a previous frame of the signal and comparing the second change signal with a threshold; and means arranged in operation to output a change indication for a picture element only if both threshold are exceeded.

10. A video movement detector comprising:

means for forming a first change signal representative of the difference between each picture element of a current frame of the video signal and a previous frame of the signal;

filter means for forming a weighted sum of the first change signals formed in respect of a picture element under consideration and picture elements spatially adjacent thereto and comparing the sum with a threshold; means for forming a second change signal representative of the difference between each picture element of a current frame of the video signal and a previous frame of the signal and comparing the second change signal with a threshold; and means arranged in operation to output a change indication for a picture element only if both thresholds are exceeded.

11. A method of coding a set of values comprising selecting that one of a plurality of possible sequences of the values which has the highest correlation between successive values in the sequence, and supplying representations of those values to an output; wherein some of the representations are the differences between the relevant value and a prediction based on at least the immediately preceding value in the selected sequence.

12. A decoder for decoding signals encoded by a method of coding an image comprising, for the image area or for each of a plurality of individual areas thereof, selecting that one of a plurality of possible sequences of the picture elements within the area which has the highest correlation between successive elements in the sequence, and supplying representations of those elements to an output; wherein some of the representations are the differences between values of the relevant element and a prediction based on the value of at least the immediately preceding element in the selected sequence, and, said decoder comprising:

means for receiving differential values and computing the absolute values thereof and resequencing means responsive, in use, to received codes indicating the selected sequence to change the sequence of the absolute values.

* * * * *